Nov. 13, 1962 F. I. DIAMOND 3,064,251
INTERFERENCE BLANKING OF MOVING TARGET INDICATOR COHERENT VIDEO
Filed Sept. 4, 1957 2 Sheets-Sheet 1

INVENTOR.
FRED I. DIAMOND
BY Wade Koontz and Harold A. Leney, Jr.
ATTORNEYS

INVENTOR.
FRED I. DIAMOND
BY Wade Koontz and Harold A. Levey, Jr.
ATTORNEYS 3,064,251
Patented Nov. 13, 1962

3,064,251

INTERFERENCE BLANKING OF MOVING TARGET INDICATOR COHERENT VIDEO

Fred I. Diamond, Rome, N.Y., assignor to the United States of America as represented by the Secretary of the Air Force Filed Sept. 4, 1957, Ser. No. 682,070
1 Claim. (Cl. 343—7.7)
(Granted under Title 35, U.S. Code (1952), sec. 266)

The invention described herein may be manufactured and used by or for the United States Government for governmental purposes without payment to me of any royalty thereon.

This invention relates generally to radar devices and more particularly to an improved method and means for eliminating interfering radar signals.

In an ordinary radar, interference from a neighboring radar may be eliminated by blanking the video during occurrence of the interfering signal. This is readily accomplished by a blanking gate triggered by the offending radar.

With an MTI (Moving Target Indicator) receiver, however, the problem is complicated by the addition of a cancellation unit, in which successive pulses are compared by delaying each pulse a repetition period and comparing the delayed and undelayed signals. Because of the delay line, two interfering pulses, spaced by the repetition period, are presented at the output of the cancellation unit for every interference pulse received.

Elimination of the interference may be accomplished by blanking of the video output of the cancellation unit, as in conventional blankers, and delaying the blanking pulse for a repetition period to provide a blanking signal for the delayed interfering pulse.

The effective elimination of interference is made even more difficult when two or more cancellation units are cascaded, and further delayed blanking signals are required.

The necessity for providing delayed blanking signals and also the subsequent loss of information due to the extra interfering signal obtained for each delay line may be eliminated by blanking of the video input (coherent video) to the cancellation unit. Since this video, in a coherent MTI receiver is bipolar, a bipolar blanker is necessary.

The mere blanking of the coherent video would achieve elimination of interference, but only at the expense of severe deterioration of MTI performance. If an interfering signal appeared during the reception of a permanent echo, blanking would result in the chopping of a "hole" in the clutter signal. The result would be an uncancelled signal, since in a repetition period later, clutter would appear where the "hole" was. Comparison of the "hole" and the clutter would result in a large residue at the output of the cancellation unit.

Blanking of the coherent video, however, can achieve effective elimination of interference without deterioration of MTI performance by the restoration of the clutter in the "hole" after blanking. This may be easily accomplished by filling the "hole" with video from the preceding repetition period. This video signal, moreover, will be at the proper level, since pulse-to-pulse amplitude changes in clutter will be negligible in an MTI receiver properly designed for a given performance or subclutter visibility.

An object of this invention is to achieve effective elimination of radar interference without deterioration of MTI performance.

Another object of this invention is to provide a method of eliminating the effects of interfering radar by blanking the coherent video and restoring the clutter in the "hole" after blanking.

A further object of this invention is to provide a method of restoring the clutter in the "hole" after blanking by filling the "hole" with video from the preceding repetition period.

These and other advantages, features and objects of the invention will become more apparent from the following description taken in connection with the illustrative embodiments in the accompanying drawings, wherein.

Figure 1:
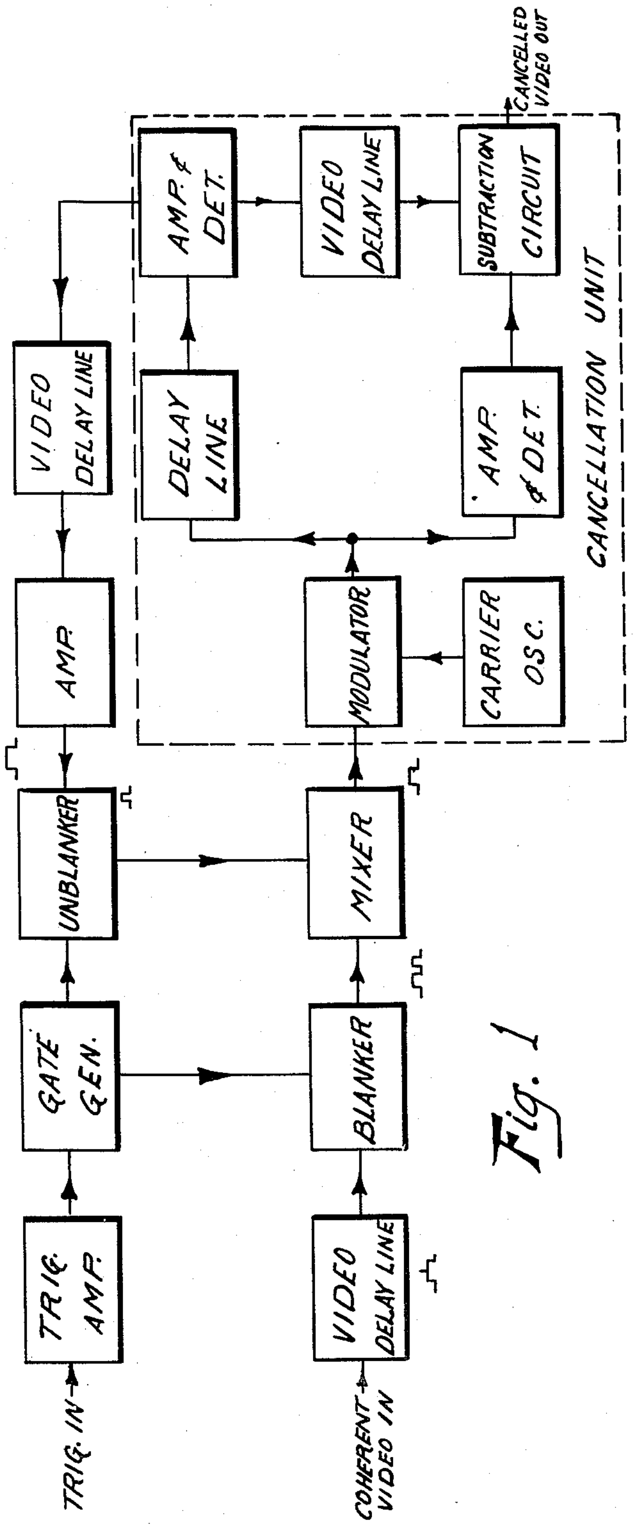
FIGURE 1 is a block diagram of a coherent video blanker.

Referring to FIGURE 1 of the drawings, a block diagram of the coherent video blanker is shown combined with a simplified block diagram of a cancellation unit. The coherent video is delayed in a video delay line for a fraction of a microsecond to assure that the blanking will begin before the interference is received. This delayed video is then fed to the "blanker," where the interference is removed, and then to a "mixer" where the "hole" is filled. The output of the mixer is then fed to the cancellation unit.

As further shown in the block diagram, the delayed output of the cancellation unit is delayed for a fraction of a microsecond, amplified, and fed to the "unblanker." The delay line is provided to assure that the "hole" is filled at the proper time, corresponding to a repetition period.

The "blanker" is such that ordinarily, bipolar video is passed to the mixer. Upon reception of the gating signals, however, the video, regardless of its polarity, is by-passed to ground.

The "unblanker" operates in a reverse manner. Ordinarily, the bipolar video is by-passed to ground, and upon reception of gating signals, the video is fed to the "mixer."

The gating signals to the blanker and unblanker are triggered by a trigger from the offending radars. The gates to the "blanker" blank the coherent video at the time of reception of an interfering signal; the gates to the "unblanker" pass video to the "mixer" at this time to fill the "hole" caused by the blanking action.

Figure 2:
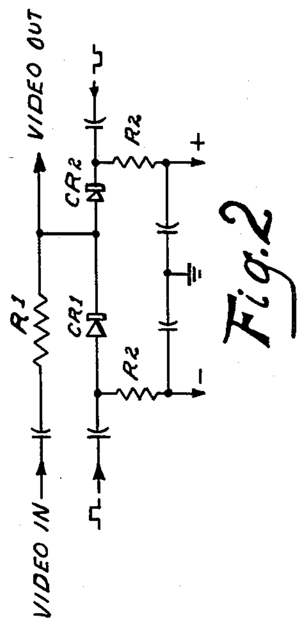
FIGURE 2 is a simplified schematic of a bipolar blanking circuit.

Shown in FIGURE 2 is a simplified schematic of the bipolar blanking circuit. The two diodes, $CR_1$ and $CR_2$, are heavily biased so that they are non-conducting for both positive and negative signals. Since the diodes are non-conducting and therefore present a high impedance, the video signals are unaffected by the circuit. However, when positive and negative gates are applied to $CR_1$ and $CR_2$ respectively, the bias is overcome and $CR_1$ becomes conducting for negative signals, and $CR_2$ becomes conducting for positive signals. Consequently video signals of either polarity are shunted to ground through a low impedance. During gating, the video signals are attenuated approximately by the ratio of $R_2/R_1$, the two resistors acting as a voltage divider.

Figure 3:
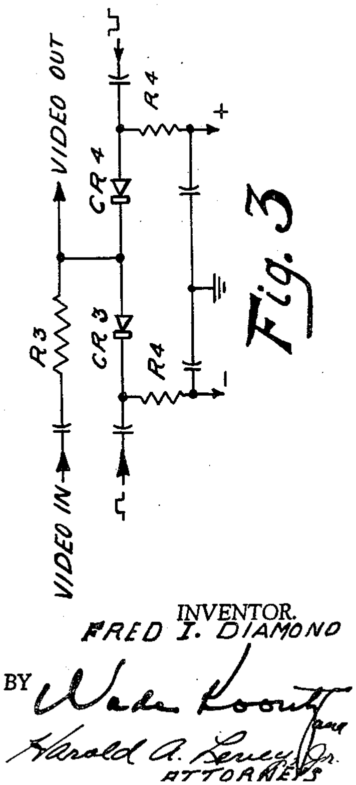
FIGURE 3 is a simplified schematic illustrating the action of an "unblanking" circuit.

The action of an "unblanking" circuit is illustrated by the simplified schematic of FIGURE 3. It will be noted that the circuit is similar to that for the "blanker," except that the diodes are reversed. In this case, $CR_3$ and $CR_4$ are heavily biased to the conducting state. As a result of this biasing, video signals of either polarity are normally shunted to ground and are attenuated by the voltage divider action of $R_4$ and $R_3$. When positive and negative gates are simultaneously applied to $CR_3$ and $CR_4$ respectively, the two diodes are biased to a non-conducting state for signals of either polarity. Therefore with the application of the gates, video signals are passed with negligible effect.

Figure 4:
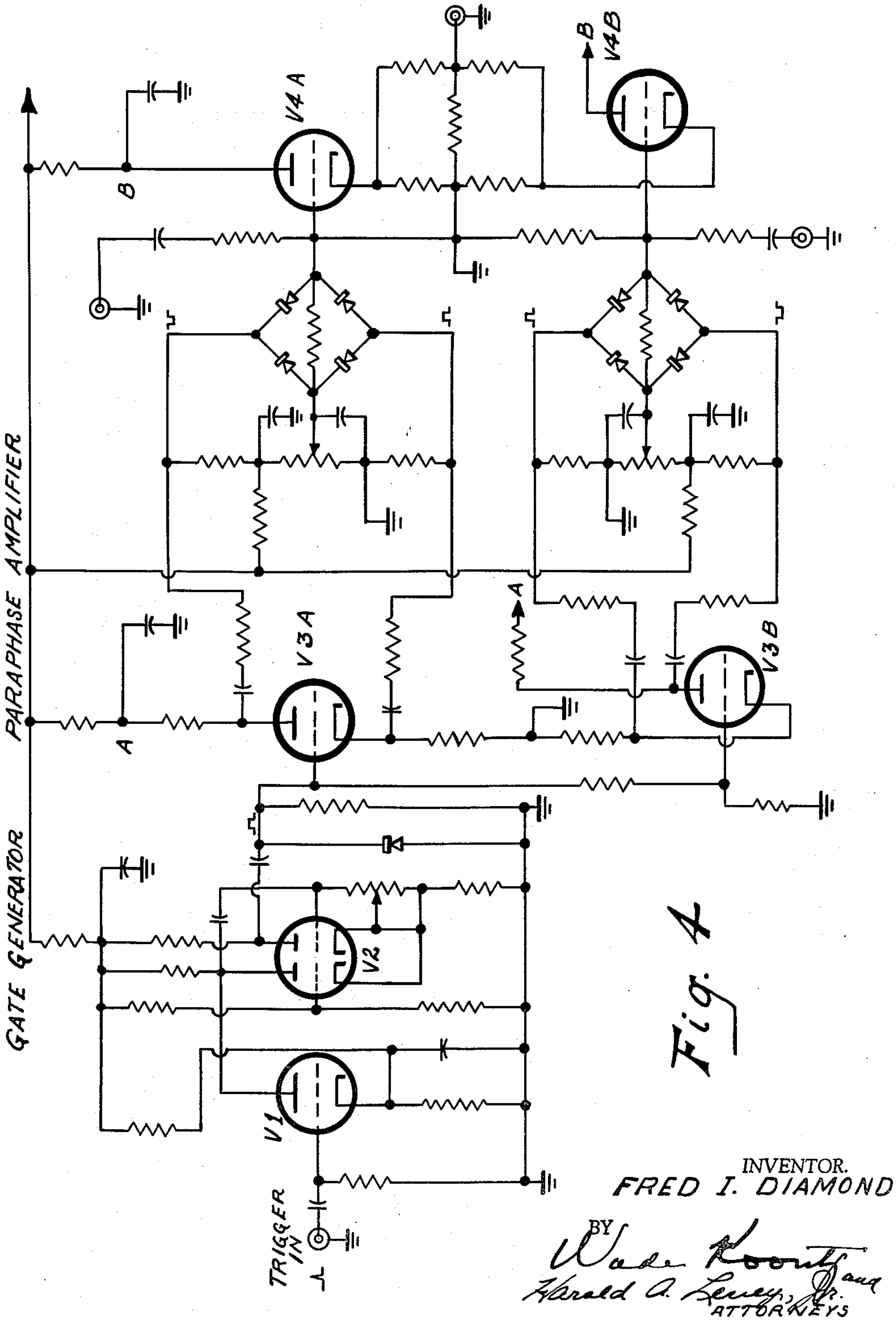
FIGURE 4 is a complete schematic of a video blanker.

The complete schematic of the essential circuitry of the coherent video blanker is shown in FIGURE 4. Tubes V2 and V3 comprise a one-shot, cathode-coupled multivibrator triggered from a positive trigger input through trigger amplifier V1. The multivibrator produces a positive gate, fed to paraphase amplifiers V4 and V5, which feed the "blanker" and "unblanker" respectively. The potentiometers shown in the "blanker" and "unblanker" are used to balance the D.-C. levels out of the "blanker" and "unblanker."

The blanked and unblanked signals are then fed to cathode followers V6 and V7 respectively, at the outputs of which the two signals are added in resistive adding networks.

Although the invention has been described with reference to particular embodiments it will be understood to those skilled in the art that the invention is capable of a variety of alternative embodiments within the spirit and scope of the appended claim.

I claim:

In a moving target indicator system, having at least one cancellation unit, the combination, with a principal signal receiving circuit for applying to said cancellation unit a coherent video signal reflected back from an intercepted moving target, of a trigger signal receiving circuit, and means responsive to the input to said trigger signal receiving circuit to operate upon the coherent signal input to said cancellation unit to blank that portion of said coherent signal input which has time coincidence with said trigger signal, means for delaying said coherent video signal, and means for substituting for the blanked-out signal content the delayed signal content received during the previous pulse repetition interval.

References Cited in the file of this patent

UNITED STATES PATENTS 2,786,993 Reid ---------------- Mar. 26, 1957